United States Patent
Jaiswal

(10) Patent No.: US 8,085,907 B2
(45) Date of Patent: *Dec. 27, 2011

(54) DYNAMIC CONTROL OF VOICE MAIL DELIVERY SEQUENCE

(75) Inventor: Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 289 days.

This patent is subject to a terminal disclaimer.

(21) Appl. No.: 12/545,102

(22) Filed: Aug. 21, 2009

(65) Prior Publication Data

US 2011/0044432 A1  Feb. 24, 2011

(51) Int. Cl.
*H04M 1/64* (2006.01)
*H04M 1/725* (2006.01)
(52) U.S. Cl. .................. 379/88.02; 379/88.19; 455/42.1
(58) Field of Classification Search ............... 379/88.02, 379/88.19; 455/412.1; 370/352
See application file for complete search history.

(56) References Cited

U.S. PATENT DOCUMENTS

| | | | |
|---|---|---|---|
| 2006/0188076 A1* | 8/2006 | Isenberg | 379/88.02 |
| 2007/0003032 A1* | 1/2007 | Batni et al. | 379/88.19 |
| 2007/0237130 A1* | 10/2007 | Milstein et al. | 370/352 |
| 2008/0059179 A1* | 3/2008 | Lagadec | 704/251 |
| 2008/0096532 A1 | 4/2008 | Lyle et al. | |

* cited by examiner

*Primary Examiner* — Davetta W Goins
*Assistant Examiner* — Mohammad Islam
(74) *Attorney, Agent, or Firm* — Leveque IP Law, P.C.

(57) ABSTRACT

A user of a conversational biometrics based voice mail system sets a user profile of the user that defines one or more biometric parameters of received voice mail intended for the user. A conversational biometrics device analyzes the voice mail in accordance with the one or more biometric parameters of the user profile set by the user and generates a biometric analysis result of the voice mail. The conversational biometrics device assigns a priority for delivery of the voice mail compared with a plurality of voice mails received by the conversational biometrics based voice mail system in accordance with the biometric analysis result and places the voice mail in a sequence in a delivery queue determined by the assigned priority. The delivery queue of the conversational biometrics based voice mail system delivers the voice mail to the user in the sequence determined by the assigned priority.

16 Claims, 2 Drawing Sheets

DYNAMIC CONTROL OF VOICE MAIL DELIVERY SEQUENCE

BACKGROUND

Voice mail systems dictate that a user wishing to listen to stored voice mails in a delivery queue must listen to stored voice mails in accordance with a rigid, non-flexible time basis, such as on a first come, first serve basis or on a first come, last serve basis. This stricture is alleviated somewhat by more flexible voice mail systems that allow callers leaving a voice mail message to indicate that their message is "urgent," thereby creating a two-level queue delivery system in which urgent voice messages are separated from normal or non-urgent messages. The burden, however, is on the caller leaving an urgent message to take definitive steps, such as through responding to canned prompts, to mark his or her message urgent.

There is no consideration by voice mail systems of the mood, gender, age, stress/loudness level, caller behavior or other biometric markers of speech made by the caller in leaving a voice mail message. Current voice mail systems thus do not analyze or take advantage of conversational biometrics to re-prioritize the delivery of a caller's voice mail in the system's delivery queue.

BRIEF SUMMARY

In accordance with embodiments consistent with the present invention, a method and system of dynamically controlling voice mail delivery is provided and supports a user of a conversational biometrics based voice mail system setting a user profile of the user that defines one or more biometric parameters of received voice mail intended for the user; receiving a voice mail from a caller at the conversational biometrics based voice mail system; a conversational biometrics device of the conversational biometrics based voice mail system analyzing the voice mail in accordance with the one or more biometric parameters of the user profile set by the user and generating a biometric analysis result of the voice mail; the conversational biometrics device assigning a priority for delivery of the voice mail compared with a plurality of voice mails received by the conversational biometrics based voice mail system in accordance with the biometric analysis result and placing the voice mail in a sequence in a delivery queue determined by the assigned priority; and the delivery queue of the conversational biometrics based voice mail system delivering the voice mail to the user in the sequence determined by the assigned priority.

BRIEF DESCRIPTION OF THE SEVERAL VIEWS OF THE DRAWINGS

The features of the invention believed to be novel are set forth with particularity in the appended claims. The invention itself however, both as to organization and method of operation may be best understood by reference to the following detailed description of the invention, which describes certain exemplary embodiments of the invention, taken in conjunction with the accompanying drawings in which:

DETAILED DESCRIPTION

Figure 1:
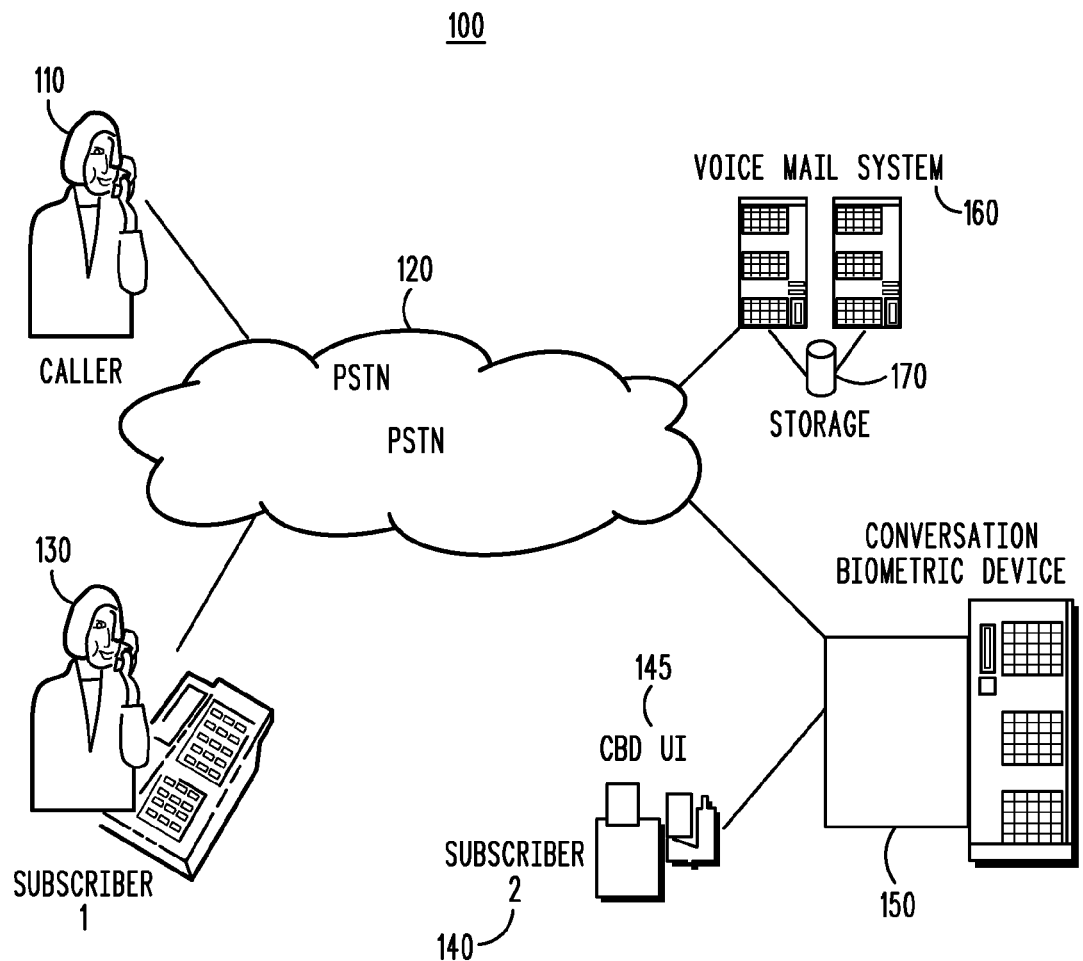
FIG. 1 is a system diagram that that illustrates a conversational biometrics based voice mail system, in accordance with certain embodiments.

Consistent with various embodiments presented herein, an improved conversational biometrics based system and method is provided. Unlike previous voice mail systems in which conversational biometric technology is not used, the various embodiments disclose that received voice mails intended for a particular user, such as a subscriber, paying or otherwise, of a conversational biometrics based voice mail system are listened to and analyzed by a conversational biometrics device (CBD) that analyzes voice mails in accordance with one or more biometric parameters that have been set by the user when setting up his particular user profile using a user interface (UI) of the conversational biometrics based voice mail system. After listening to and analyzing a voice mail, the CBD may store it in the conversational biometrics based voice mail system.

Biometric parameters that a user may set or not set while setting up his user specific user profile are indicative of biometric audio patterns of voice speech or utterances of a caller that can be recognized and analyzed by conversational biometric technology. Such biometric patterns include, but are not limited to, the age, mood (happy, exasperated, angry, etc.), feeling, stress level, loudness level (often associated with the stress level), gender, identity of a caller, and location of the caller (such as might be indicated by background noise or physical location, for example). The user as shown in the drawing(s) may be a subscriber of the conversational biometrics based voice mail system. Such a user or subscriber may set or reset their user profile as often or as infrequently as desired. For example, a user may wish to daily reset their user profile to reflect those voice mails they are expecting so that they may be prioritized higher in the delivery queue; voice messages from calls associated with the user's supervisor's location, as reflected by the supervisor's phone number(s), may be given a higher priority in the user profile than other voice mail. Or, a subscriber user may set his profile to always give number one priority to a teenaged son or daughter traveling on a school field trip. Of course, another high priority biometric parameter for a user in a customer service environment could be a voice mail indicative of a caller who is extremely upset, stressed or loud. Conversely, depending upon the mood of the user himself, the user may set his user profile to place voice mail having an angry biometric parameter at the end of the delivery queue behind voice mail having a good mood biometric parameter. As another example, a user having a sick, elderly relative could set his user profile to always give preference to voice mail having a biometric parameter reflective of an elderly caller.

Therefore, in accordance with various embodiments, a conversational biometrics based voice mail system, such as system 100 of FIG. 1 is presented. The conversational biometrics based voice mail system has several components that interface with a public switched telephone network (PSTN) phone system 120. One or more callers 110 wish to reach a user, such as subscriber1 130 or Subscriber2 140 via PSTN 120. When the caller cannot reach the desired user, the caller is invited to leave a voice mail with voice mail system 160, where it can be stored in storage element 170.

Conversational biometrics device (CBD) 160 is in communication with the PSTN 120 as well as directly with a CBD user interface (CBD UI) 145 for subscriber2 140. While CBD UI 145 of subscriber2 140 is illustrated as a web-based user interface accessed by subscriber2 140 via the Internet, the user interface may alternatively be an audio-based user interface accessed by the user via a phone system, such as the PSTN; subscriber1 130 may access her user profile in this manner. Conversely, the user interface may be a web-based user interface accessed by the user via the Internet.

The CBD 150 analyzes a voice mail received from caller 110 or other caller(s) that are intended for a particular a user, such as 130 or 140, in accordance with one or more biometric parameters of a user profile of the user. CBD 150 generates a biometric analysis result of the analyzed voice mail and assigns a priority for delivery of the voice mail compared with other voice mails intended for the user and received by the conversational biometrics based voice mail system. Priority for delivery of the voice mail is determined by CBD 150 in accordance with the biometric analysis result.

Prior to analysis of a received voice mail, a user will have interfaced with a user interface, coupled to the conversational biometrics device and described above, to set the user profile of the user. The user profile of the user defines the one or more biometric parameters of received voice mail intended for the user. Examples of biometric parameters of the user profile include the age, mood, feeling, stress level, loudness level, gender, identity, and location of the caller of the voice mail. The user profile may be stored in storage element 170 of voice mail system 160.

The received and analyzed voice mail is placed in a sequence of a delivery queue of voice mail system 160, as determined by the priority for delivery assigned by the CBD 150 and the delivery queue delivers the voice mail to the user in accordance with the sequence of the delivery queue. It is noted that CBD 150 is operable to analyze each voice mail received by the conversational biometrics based voice mail system 100 or some subset thereof. For example, the control of voice mail delivery sequence based on caller biometric information in a given conversational biometrics based voice mail system 100 may only be provided to those subscribers who pay for the extra service. Thus, biometric information stored in a user profile may only be used when a particular user pays for this additional service.

The storage element 170 coupled to voice mail system 160 can store user profile(s) as well as received voice mails and analysis results of the CBD 150.

The user profile set by a user or subscriber may be changed or re-set by the user as desired. Thus, a user can interface with his or her user interface to set a new user profile that defines one or more new biometric parameters that are different from the one or more biometric parameters of a previous user profile. In this case, when the CBD 150 analyzes a voice mail in accordance with the one or more new biometric parameters of the new user profile set by the user, it generates a new biometric analysis result of the voice mail. The CBD 150 will assign a new priority for delivery of the voice mail in accordance with the new biometric analysis result and place the voice mail in a new sequence in the delivery queue as determined by the new assigned priority.

Figure 2:
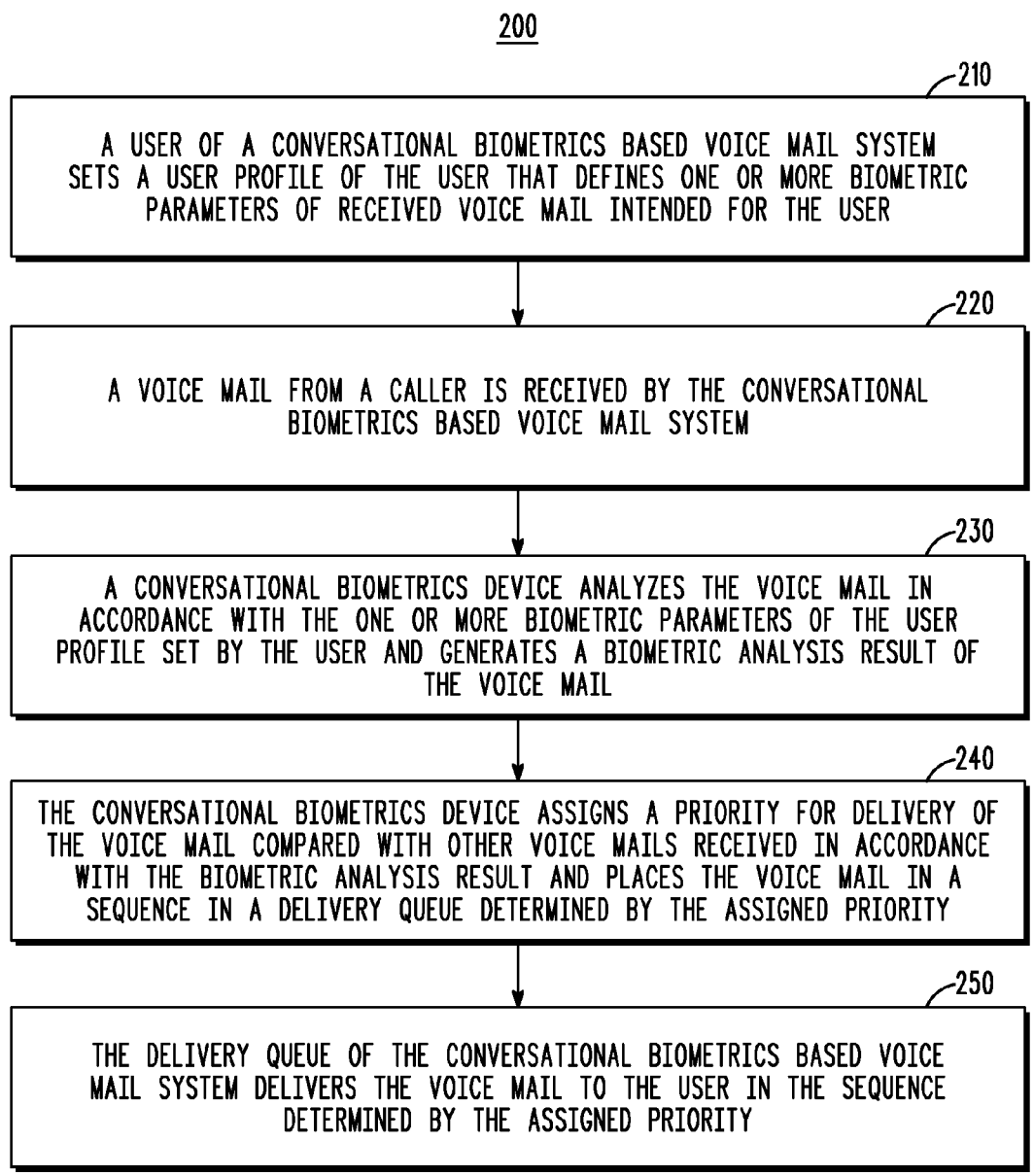
FIG. 2 is a flow diagram that illustrates dynamic control of voice mail delivery using caller biometric information, in accordance with certain embodiments.

In accordance with various embodiments, a method of dynamically controlling voice mail delivery using caller biometric information is provided. Referring now to flow chart 200 of FIG. 2, at Block 210, a user of a conversational biometrics based voice mail system (CBBVMS) sets a user profile of the user that defines one or more biometric parameters of received voice mail intended for the user. This occurs before the CBD can analyze incoming voice mail intended for that user. The user sets his or her user profile with the one or more biometric parameters using a conversation biometric device user interface (CBDUI); as mentioned, this may be an audio or web-based user interface.

The user may set a new user profile as often has is desired; the new user profile defines one or more new biometric parameters that are different from the one or more biometric parameters of the user profile. The new user profile can be used to analyze a voice mail, assign a priority for delivery of the voice mail, and deliver the voice mail, as described in Blocks 230, 240 and 250.

At Block 220, then, a voice mail from a caller is received at the conversational biometrics based voice mail system. The conversational biometrics device (CBD) of the conversational biometrics based voice mail system analyzes the voice mail in accordance with the one or more biometric parameters of the user profile set by the user and generates a biometric analysis result of the voice mail as a result of Block 230. As previously noted, the voice mail may be stored in a storage element of the system after it has been analyzed. At Block 240, the conversational biometrics device CBD assigns a priority for delivery of the voice mail compared with other voice mails received, in accordance with the biometric analysis result and placing the voice mail in a sequence in a delivery queue determined by the assigned priority. At Block 250, the delivery queue of the conversational biometrics based voice mail system delivers the voice mail to the user in the sequence determined by the assigned priority.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of dynamical control of voice mail delivery, comprising:

a user of a conversational biometrics based voice mail system setting a user profile of the user that defines one or more biometric parameters of received voice mail intended for the user;

receiving a voice mail from a caller at the conversational biometrics based voice mail system;

a conversational biometrics device of the conversational biometrics based voice mail system analyzing the voice mail in accordance with the one or more biometric parameters of the user profile set by the user and generating a biometric analysis result of the voice mail;

the conversational biometrics device assigning a priority for delivery of the voice mail compared with a plurality of voice mails received by the conversational biometrics based voice mail system in accordance with the biometric analysis result and placing the voice mail in a sequence in a delivery queue determined by the assigned priority; and the delivery queue of the conversational biometrics based voice mail system delivering the voice mail to the user in the sequence determined by the assigned priority.

2. The method of claim 1, further comprising storing the voice mail in a storage element of the conversational biometrics based voice mail system after analyzing the voice mail.

3. The method of claim 1, further comprising the user setting the user profile with the one or more biometric parameters using a conversation biometric device user interface.

4. The method of claim 1, further comprising the user setting a new user profile that defines one or more new biometric parameters that are different from the one or more biometric parameters of the user profile.

5. The method of claim 4, further comprising the conversational biometrics device of the conversational biometrics based voice mail system analyzing the voice mail in accordance with the one or more new biometric parameters of the new user profile set by the user and generating a new biometric analysis result of the voice mail; and assigning a new priority for delivery of the voice mail in accordance with the new biometric analysis result and placing the voice mail in a new sequence in the delivery queue determined by the new assigned priority.

6. The method of claim 1, wherein the one or more biometric parameters of the user profile comprise one or more of the age, mood, feeling, stress level, loudness level, gender, identity, and location of the caller of the voice mail.

7. The method of claim 1, further comprising the user subscriber to a service of the conversational biometrics based voice mail system that performs the method.

8. A system, comprising:

a conversational biometrics device that analyzes a voice mail received from a caller intended for a user of a conversational biometrics based voice mail system in accordance with one or more biometric parameters of a user profile of the user, generates a biometric analysis result of the voice mail, and assigns a priority for delivery of the voice mail compared with a plurality of voice mails intended for the user and received by the conversational biometrics based voice mail system, wherein the priority for delivery of the voice mail is determined by the conversational biometrics device in accordance with the biometric analysis result;

a user interface coupled to the conversational biometrics device and used by the user of the conversational biometrics based voice mail system to set the user profile of the user, wherein the user profile of the user defines the one or more biometric parameters of received voice mail intended for the user; and a delivery queue of the conversational biometrics based voice mail system, wherein the voice mail is placed in a sequence of the delivery queue as determined by the priority for delivery assigned by the conversational biometrics device and the deliver queue delivers the voice mail to the user in accordance with the sequence of the delivery queue.

9. The system of claim 8, further comprising:

a storage element coupled to the conversational biometrics device, wherein after the conversational biometrics device analyzes the voice mail the conversational biometrics device stores the voice mail in the storage element.

10. The system of claim 8, wherein the one or more biometric parameters of the user profile comprise one or more of the age, mood, feeling, stress level, loudness level, gender, identity, and location of the caller of the voice mail.

11. The system of claim 8, wherein the conversational biometrics device analyzes each voice mail of the plurality of received voice mails intended for the user.

12. The system of claim 8, wherein the user is a subscriber of the conversational biometrics based voice mail system.

13. The system of claim 8, wherein the user interfaces with the user interface to set a new user profile that defines one or more new biometric parameters that are different from the one or more biometric parameters of the user profile.

14. The system of claim 13, wherein the conversational biometrics device analyzes the voice mail in accordance with the one or more new biometric parameters of the new user profile set by the user and generates a new biometric analysis result of the voice mail, and wherein the conversational biometrics device assigns a new priority for delivery of the voice mail in accordance with the new biometric analysis result and places the voice mail in a new sequence in the delivery queue as determined by the new assigned priority.

15. The system of claim 8, wherein the user interface is a web-based user interface accessed by the user via the Internet.

16. The system of claim 8, wherein the user interface is an audio-based user interface accessed by the user via a phone system.

* * * * *